United States Patent
Prigent

(10) Patent No.: US 12,084,010 B2
(45) Date of Patent: Sep. 10, 2024

(54) METHOD AND SYSTEM OF HYDRAULIC BRAKING FOR VEHICLE WITH COUPLING

(71) Applicant: POCLAIN HYDRAULICS INDUSTRIE, Verberie (FR)

(72) Inventor: André Prigent, Verberie (FR)

(73) Assignee: POCLAIN HYDRAULICS INDUSTRIE, Verberie (FR)

( * ) Notice: Subject to any disclaimer, the term of this patent is extended or adjusted under 35 U.S.C. 154(b) by 862 days.

(21) Appl. No.: 17/255,494

(22) PCT Filed: Jun. 25, 2019

(86) PCT No.: PCT/FR2019/051556
§ 371 (c)(1),
(2) Date: Dec. 23, 2020

(87) PCT Pub. No.: WO2020/002823
PCT Pub. Date: Jan. 2, 2020

(65) Prior Publication Data
US 2021/0269003 A1 Sep. 2, 2021

(30) Foreign Application Priority Data
Jun. 28, 2018 (FR) .................................. 1855858

(51) Int. Cl.
*B60T 13/14* (2006.01)
*B60T 8/32* (2006.01)
*B60T 13/68* (2006.01)

(52) U.S. Cl.
CPC ............ *B60T 13/148* (2013.01); *B60T 8/323* (2013.01); *B60T 13/686* (2013.01); *B60T 2250/04* (2013.01); *B60T 2270/406* (2013.01)

(58) Field of Classification Search
CPC ...... B60T 8/1708; B60T 8/323; B60T 13/263; B60T 13/265; B60T 13/148; B60T 13/686; B60T 2250/04; B60T 2270/406
See application file for complete search history.

(56) References Cited

U.S. PATENT DOCUMENTS 5,061,015 A * 10/1991 Cramer ................. B60T 13/263
303/7
5,695,260 A * 12/1997 Tanaka .................... B60T 17/22
303/3

(Continued)

FOREIGN PATENT DOCUMENTS

| EP | 2918469 A1 | 9/2015 |
| EP | 3103691 A1 | 6/2016 |

(Continued)

OTHER PUBLICATIONS

Official Journal of the European Union, "Commission Delegated Regulation (EU) 2015/68", 2015, pp. 1-139.

*Primary Examiner* — Bradley T King
(74) *Attorney, Agent, or Firm* — The Webb Law Firm

(57) ABSTRACT

A method for driving a braking circuit for a vehicle equipped with a coupling is disclosed.
The vehicle includes a hydraulic supply circuit and a hydraulic control circuit equipped with a driving device.
The coupling includes a hydraulic braking circuit linked to the hydraulic supply circuit and to the hydraulic control circuit and includes a hydraulic accumulator.
When the vehicle is stopped and
the pressure inside the hydraulic accumulator is less than or equal to a threshold pressure value,
the driving device increases the pressure of the hydraulic accumulator via the hydraulic control circuit.

15 Claims, 3 Drawing Sheets

(56) References Cited

U.S. PATENT DOCUMENTS

| | | | |
|---|---|---|---|
| 8,249,789 B2* | 8/2012 | Ramler | B60T 13/268 |
| | | | 303/64 |
| 10,549,742 B2 | 2/2020 | Boulivan | |
| 10,850,721 B2* | 12/2020 | Niglas | B60T 8/1708 |
| 11,192,535 B2* | 12/2021 | Lemaitre | B60T 7/20 |
| 2006/0049009 A1* | 3/2006 | Arnold | F16D 67/00 |
| | | | 188/82.6 |
| 2007/0102996 A1* | 5/2007 | Kelly | B60T 13/745 |
| | | | 303/3 |
| 2015/0232078 A1 | 8/2015 | Nagura | |
| 2018/0029571 A1 | 2/2018 | Schick et al. | |
| 2018/0273014 A1* | 9/2018 | Boulivan | B60T 8/1701 |

FOREIGN PATENT DOCUMENTS

| | | |
|---|---|---|
| EP | 3275745 A1 | 1/2018 |
| WO | 2017050632 A1 | 3/2017 |

\* cited by examiner

METHOD AND SYSTEM OF HYDRAULIC BRAKING FOR VEHICLE WITH COUPLING

CROSS-REFERENCE TO RELATED APPLICATIONS

This application is the United States national phase of International Application No. PCT/FR2019/051556 filed Jun. 25, 2019, and claims priority to French Patent Application No. 1855858 filed Jun. 28, 2018, the disclosures of which are hereby incorporated by reference in their entirety.

BACKGROUND OF THE INVENTION

Field of the Invention

This Invention relates to the field of hydraulic braking circuits, and in particular has an application for vehicles coupled to trailers.

Description of Related Art

Hydraulic braking systems for vehicles able to be equipped with a trailer, for example tractors, must allow for driving of the brake of both the vehicle and the trailer. The driving of the trailer brake is customarily separate from the driving of the vehicle brake.

The regulation EU 2015/68 in particular stipulates that in the event of breakage of the link between the vehicle and its coupling, the latter must be automatically braked.

Two types of system are then commonly used; brake systems equipped with actuators of SAHR (Spring Apply Hydraulic Release) type or brake systems equipped with a single actuator that can be filled by an accumulator. For this second type of brake system, a recurring problem concerns the supply of this accumulator. Specifically, known systems bleed pressure on a hydraulic line when the user actuates a dedicated control in order to charge the accumulator.

However, the accumulator is used for the braking of the coupling as soon as a coupling breakage is detected. Known systems detect a coupling breakage via a detection of pressure, in particular a pressure drop, in a hydraulic line between the vehicle and the coupling, more precisely between a braking valve Integrated into the vehicle and the braking means of the trailer. However, several maneuvers can cause a pressure drop in this hydraulic line, without a coupling breakage having necessarily occurred. In particular, the actuation of the handbrake of the vehicle will cause a pressure drop in the hydraulic line, which is considered as a coupling breakage by the electronic system of the vehicle, and hence causes the discharging of the accumulator into the braking system of the trailer, thus performing an emergency braking of this trailer.

Thus, the user must deliberately actuate a control in order to trigger the charging of the accumulator, in particular by way of a pedal, typically the brake pedal, or a control such as a joystick. This action must be done frequently, particularly when starting the vehicle, after each use of the handbrake, and where applicable at regular Intervals if the system has leaks.

It will thus be understood that such systems are not only restrictive for the user, but can also prove dangerous if the driver does not perform the operations of charging of the accumulator, which is then unable to provide the function of braking of the coupling in the event of a coupling breakage.

SUMMARY OF THE INVENTION

The aim of the present disclosure is thus to make provision for a solution to this problem.

For this purpose, the present disclosure makes provision for a hydraulic braking system for a coupling of a vehicle, wherein
the vehicle comprises a hydraulic supply circuit and a hydraulic control circuit,
the coupling comprises a hydraulic braking circuit, linked via connectors to the hydraulic supply circuit and to the hydraulic control circuit of the vehicle, and a hydraulic accumulator suitable for delivering a braking pressure to braking means of the coupling,
the system being characterized in that it comprises a driving device configured in such a way that, when
the vehicle is stopped, and
the pressure inside the hydraulic accumulator is less than or equal to a threshold pressure value, the driving device Increases the pressure of the hydraulic accumulator via the hydraulic control circuit.

According to an example, the vehicle comprises a parking brake, and wherein the driving device is configured in such a way as to determine whether or not the vehicle is stopped according to whether or not said parking brake is applied.

According to an example, the driving device is configured in such a way as to not increase the pressure of the hydraulic accumulator if a test signal is actuated.

According to an example, the hydraulic accumulator is linked to the hydraulic control circuit via a tared valve, and wherein the driving device is configured in such a way as to deliver a pressure via the hydraulic control circuit strictly greater than a taring pressure of the tared valve.

According to an example, the system further comprises a speed sensor suitable for measuring the speed of travel of the vehicle, and delivering the item of information to the driving device.

According to an example, the hydraulic supply circuit is configured in such a way as to deliver a zero pressure when the parking brake of the vehicle is applied. The present disclosure also concerns a method for driving a braking circuit for a vehicle equipped with a coupling,
the vehicle comprising a hydraulic supply circuit and a hydraulic control circuit equipped with a driving device,
the coupling comprising a hydraulic braking circuit linked to the hydraulic supply circuit and to the hydraulic control circuit and comprising a hydraulic accumulator
wherein, when
the vehicle is stopped, and
the pressure inside the hydraulic accumulator is less than or equal to a threshold pressure value, the driving device Increases the pressure of the hydraulic accumulator via the hydraulic control circuit.

According to an example, the determination of whether or not the vehicle is stopped is performed according to whether or the parking brake of the vehicle is applied.

According to an example, the driving device only Increases the pressure of the hydraulic accumulator via the hydraulic control circuit in the absence of a test signal.

According to an example, the driving device drives the hydraulic control circuit in such a way as to deliver a pressure strictly greater than a taring pressure of a tared valve linking the hydraulic accumulator to the hydraulic control circuit.

According to an example, a speed sensor delivers an item of Information relating to the speed of travel of the vehicle to the driving device.

BRIEF DESCRIPTION OF THE DRAWINGS

The invention and its advantages will be better understood upon reading the detailed description given below of different embodiments of the invention given by way of non-limiting example. This description refers to the appended pages of figures, wherein.

In all the figures, common elements are identified by identical reference numbers.

DESCRIPTION OF THE INVENTION

Figure 1:
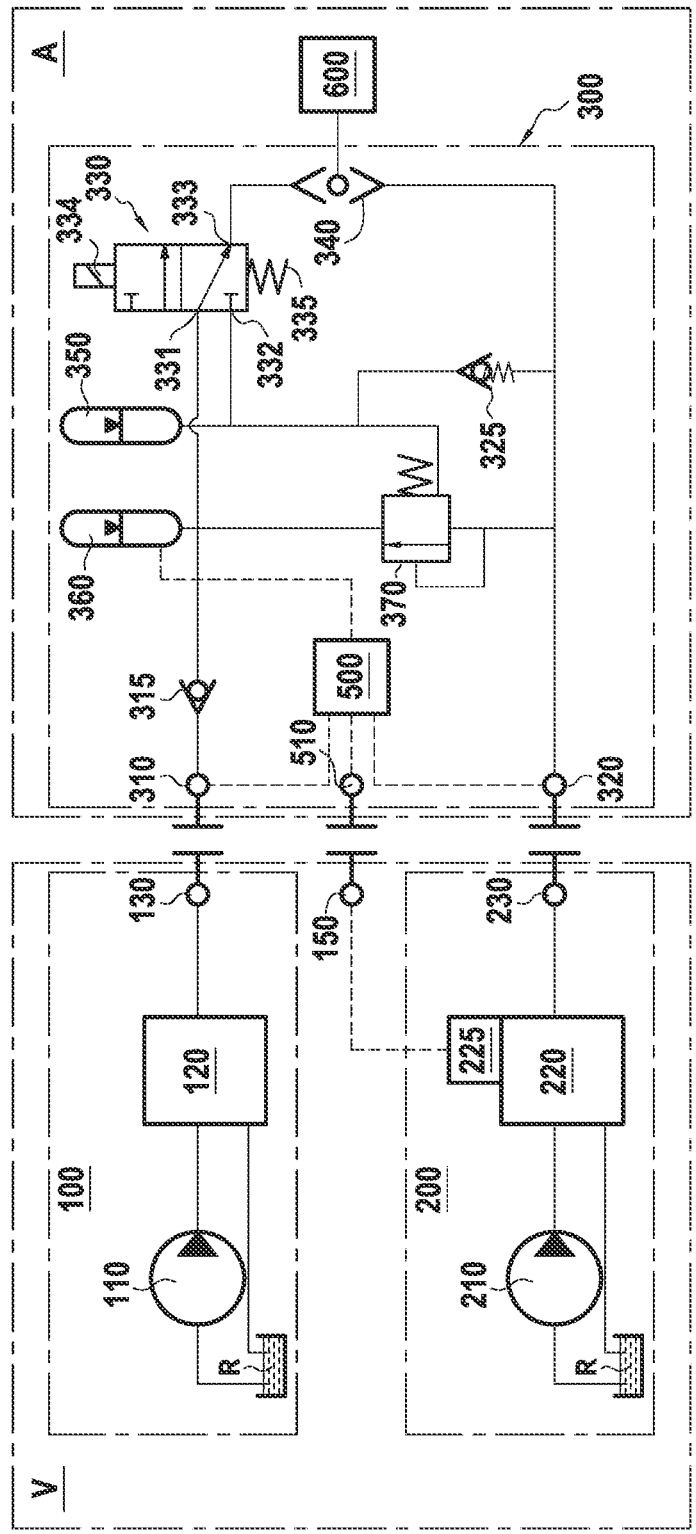
FIG. 1 represents an example of a circuit according to an aspect of the invention, FIG. 2 schematically illustrates a method according to an aspect of the invention.

FIG. 1 shows a system according to an aspect of the Invention.

On this figure are represented the hydraulic circuits components of a vehicle V equipped with a coupling A.

The vehicle V comprises a hydraulic supply circuit 100 and a hydraulic control circuit 200. The coupling A comprises a hydraulic braking circuit 300.

The hydraulic supply circuit 100 comprises a supply pressure source 110, typically a hydraulic pump that can be a fixed-displacement pump bleeding fluid from a reservoir R, as well as a supply valve 120 linking the supply pressure source 110 to a hydraulic supply connector 130. The supply valve 120 is used to drive the flow rate of fluid delivered by the supply pressure source 110 to the hydraulic supply connector 130 or to discharge the fluid into the reservoir R, and is configured in such a way that if the parking brake of the vehicle V is applied, the pressure delivered to the hydraulic supply connector 130 is zero.

The hydraulic control circuit 200 comprises a control pressure source 210, typically a fixed-displacement hydraulic pump bleeding fluid into a reservoir R, as well as a control valve 220 linking the control pressure source 210 to a hydraulic control connector 230. The control valve 220 makes it possible to drive the flow rate of fluid delivered by the control pressure source 210 to the hydraulic control connector 230 or to discharge the fluid into the reservoir R. The control valve 220 is associated with a computer 225 such as an Electronic Control Unit (ECU) driving the control valve 220 and thus the flow rate delivered by the control pressure source 210 to the hydraulic control connector 230.

The hydraulic braking circuit 300 comprises a primary connector 310 and a secondary connector 320, adapted to be connected respectively to the hydraulic supply connector 130 and to the hydraulic control connector 230 of the vehicle V. According to the terminology of the European regulation 2015/68, the hydraulic line formed by connecting the hydraulic supply connector 130 and the primary connector 310 is referred to as the supplementary line, and the hydraulic line formed by connecting the hydraulic control connector 230 and the secondary connector 320 is referred to as the control line.

The coupling A comprises a braking device 600 comprising hydraulic braking means supplied by the hydraulic braking circuit 300. Said braking means are typically associated with the wheels or with at least one auxiliary hydraulic motor associated with an axle or with a wheel. The hydraulic braking circuit 300 is linked to the braking device 600 via a high-pressure selector 340.

The high-pressure selector 340 is linked on the one hand to the secondary connector 320, and on the other hand to the primary connector 310 by way of a braking valve 330.

The braking valve 330 has a first orifice 331, a second orifice 332 and a third orifice 333.

The first orifice 331 is linked to the primary connector 310 by way of a shut-off valve 315 only allowing the passing of fluid in the direction of the primary connector 310 toward the first orifice 331

The second orifice 332 is linked to a low-pressure accumulator 350 and to the secondary connector 320 via a tared shut-off valve 325

The third orifice 333 is linked to the high-pressure selector 340.

The braking valve 330 is driven by a control 334, typically electrical, which is opposed by a return element 335. The braking valve is thus driven to switch between two positions:

a first position wherein the second orifice 332 is closed, and the first orifice 331 is linked to the third orifice 333, and a second position wherein the first orifice 331 is closed, and the second orifice 332 is linked to the third orifice 333.

The control 334 and the return element 335 are typically configured such that, by default, i.e. If there is no driving by the control 334, the braking valve 330 is in its first position.

The secondary connector 320 is also linked to the first orifice 331 of the braking valve 330 via a filling valve 370, configured to allow fluid to pass in the forward direction of the secondary connector 320 toward the first orifice 331 of the braking valve 330 when the pressure at the level of the secondary connector 320 exceeds a pressure threshold value. This pressure threshold value is typically high, for example in the order of 100 bar.

The hydraulic braking circuit 300 also comprises a braking accumulator 360, linked to the first orifice 331 of the braking valve 330.

The hydraulic braking circuit 300 comprises a controller 500 linked to an electrical connector 510 of the coupling A, associated with pressure sensors supplying an item of Information relating to the pressure at the primary connector 310, the secondary connector 320 and also within the braking accumulator 360.

By way of variant, only the vehicle V comprises a computer 225. The signals from the coupling A are then transmitted directly to this computer 225 by way of the electrical connectors 150 and 510.

In another embodiment, the controller 500 of the coupling A is a pressure switch reacting to a change of pressure in the braking accumulator 360 and then enabling or not enabling the valve 330.

For the sake of clarity in the drawing several pumps have been represented. But obviously there may be only a single shared pump for the hydraulic supply circuit 100 and for the hydraulic control circuit 200.

When the coupling A is linked to the vehicle V, the primary connector 130 is linked to the hydraulic supply connector 310, and the secondary connector 320 is linked to the hydraulic control connector 230. An electrical connection is also made between the vehicle V and the coupling A via the electrical connector 510 of the coupling A and an electrical connector 150 of the vehicle V.

The supply pressure source 110 delivers a pressure that is classified as low pressure, typically between 0 and 35 bar, which then pre-charges the braking accumulator 360. The braking valve 330 is driven according to the presence of a pressure on the supplementary line in order to deliver or not deliver a pressure to the braking device 600 via the high-pressure selector 340. According to an example, a pressure amplifier can be disposed on the coupling A, on the supplementary line, parallel to the shut-off valve 315, in order to amplify the pressure in the supplementary line for the purpose of actuating the braking device 600.

The control pressure source 210 delivers a variable pressure to the secondary connector 320 via the control valve 220. The delivered pressure is driven by the control valve 220, and is typically a function of a braking setpoint applied by the user of the vehicle V. The pressure delivered is commonly classified as "high pressure", typically between 0 and 150 bar.

When a braking setpoint is applied, the control valve delivers a pressure proportional to this setpoint, which then actuates the braking device 600. If the pressure is sufficient, the braking accumulator 360 is charged via the pressure limiter 370.

When the user stops applying the braking setpoint, the pressure delivered via the secondary connector 320 is reduced or zero. The pressure in the braking device 600 is then typically discharged via the connector 320 and the valve 220 into the vehicle reservoir V.

In the event of a coupling breakage, the primary connector 310 and the secondary connector 320 are respectively disengaged from the hydraulic supply connector 130 and the hydraulic control connector 230. The pressure at the primary connector 310 and the secondary connector 320 thus becomes zero. The braking valve 330 switches into its first configuration due to the breakage in the electrical supply of the coupling or due to the pressure drop in the hydraulic line between the primary connector 310 and the shut-off valve 315 if the braking valve 300 is driven by a pressure switch.

The braking accumulator 360 then discharges via the braking valve 330 toward the braking device, providing an emergency braking function.

It will therefore be understood here that it is important to ensure that the braking accumulator 360 is charged.

However, under normal operation, the accumulator is only recharged when the braking force commanded by the user is sufficient, as described previously, and it discharges when the parking brake is actuated.

In order to ensure the charging of the braking accumulator 360, the computer 225 is configured in such a way as to drive the control valve 220 in order to automatically perform the charging of the braking accumulator 360 when certain conditions are verified.

More precisely, the computer 225 will drive the control valve 220 in such a way as to deliver a pressure via the secondary connector 320 in order to charge the braking accumulator 360 when the following conditions are verified:

The vehicle is stopped, typically with an applied parking brake,

The charging of the braking accumulator 360 is insufficient, and

The vehicle or the coupling is not in the parking brake test phase.

These different parameters are for example detected as follows.

The fact that the vehicle is stopped (typically with a parking brake applied) can for example be detected by measuring the pressure at the hydraulic control connector 130 (the pressure being zero in the event of the parking brake being applied), and/or by measuring the speed of travel of the vehicle V for example by means of a speed sensor or a means of locating the vehicle, the condition then being that the speed is zero, or else by receiving a signal from the control electronics of the vehicle V.

The charging of the braking accumulator 360 is measured by means of a pressure sensor, which supplies the item of Information to the controller 500, the latter supplying the item of Information to the computer 225 via the electrical connectors 510 and 150. The condition is typically satisfied when the pressure within the braking accumulator 360 is less than or equal to a threshold pressure value.

The fact that the vehicle or the coupling is not in the parking brake test phase is an item of information provided by the on-board electronics in the vehicle or in the coupling.

Figure 2:
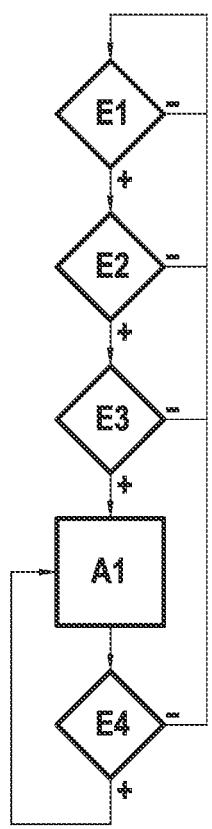

FIG. 2 schematically represents a control algorithm of the driving device.

The different blocks of the algorithm are as follows:

E1: step of determining the charge of the braking accumulator 360. The charge of the braking accumulator 360 is measured, for example via a pressure sensor. If the pressure within the braking accumulator 360 is less than or equal to a threshold pressure value, then the algorithm goes to step E2. In a variant the pressure drop in the braking accumulator 360 can be detected by a pressure switch. If the answer is negative, it continues step E1.

E2: step of determining whether or not the vehicle is stopped, and/or whether or not the parking brake of the vehicle is applied. As Indicated previously, this determination is for example performed by receiving a signal from the control electronics of the vehicle V, by measuring or by detecting the pressure at the hydraulic control connector 130, 310 and/or by measuring the speed of travel of the vehicle V for example by means of a speed sensor or a means of locating the vehicle, the condition then being that the speed is zero. If the computer determines that the parking brake is applied the algorithm goes to step E3, if not the algorithm returns to step E1.

E3: optional step of verifying that the vehicle is not in a test mode. If the vehicle is indeed not in test mode, then the algorithm goes to step A1. If not (i.e. If the vehicle is in test mode), the algorithm returns to step E1.

It should be noted that the order in which the steps E1, E2 and optionally E3 are carried out can be modified, as long as the algorithm verifies that the two (or optionally three) conditions are met before enabling A1.

A1: action of Increasing the pressure of the braking accumulator 360. This pressure increase is carried out by means of the pressure control source 210, as described previously.

E4: step of determining the charge of the braking accumulator 360. During this step, the charge of the braking accumulator 360 is measured again, in order to determine if it has reached a sufficient level. If the pressure within the braking accumulator 360 is greater than or equal to a second threshold pressure value (which can be Identical or separate from the threshold pressure value of step E1), then the algorithm stops step A1, and returns to step E1. If not, the algorithm continues the execution of step A1.

In practice, the proposed system thus makes it possible to ensure the automatic charging of the braking accumulator 360 every time the vehicle V starts and after each stop if necessary, without requiring a specific action from the user, which is highly advantageous both in terms of ease of use but also safety.

The fact that the charging of the braking accumulator 360 is carried out when the vehicle is stopped (typically when the parking brake is engaged) is advantageous in that the power consumed for the charging of the braking accumulator 360 is not penalizing for the travel of the vehicle V, since the vehicle is stopped. This operation therefore has no impact on the user's driving.

Figure 3:
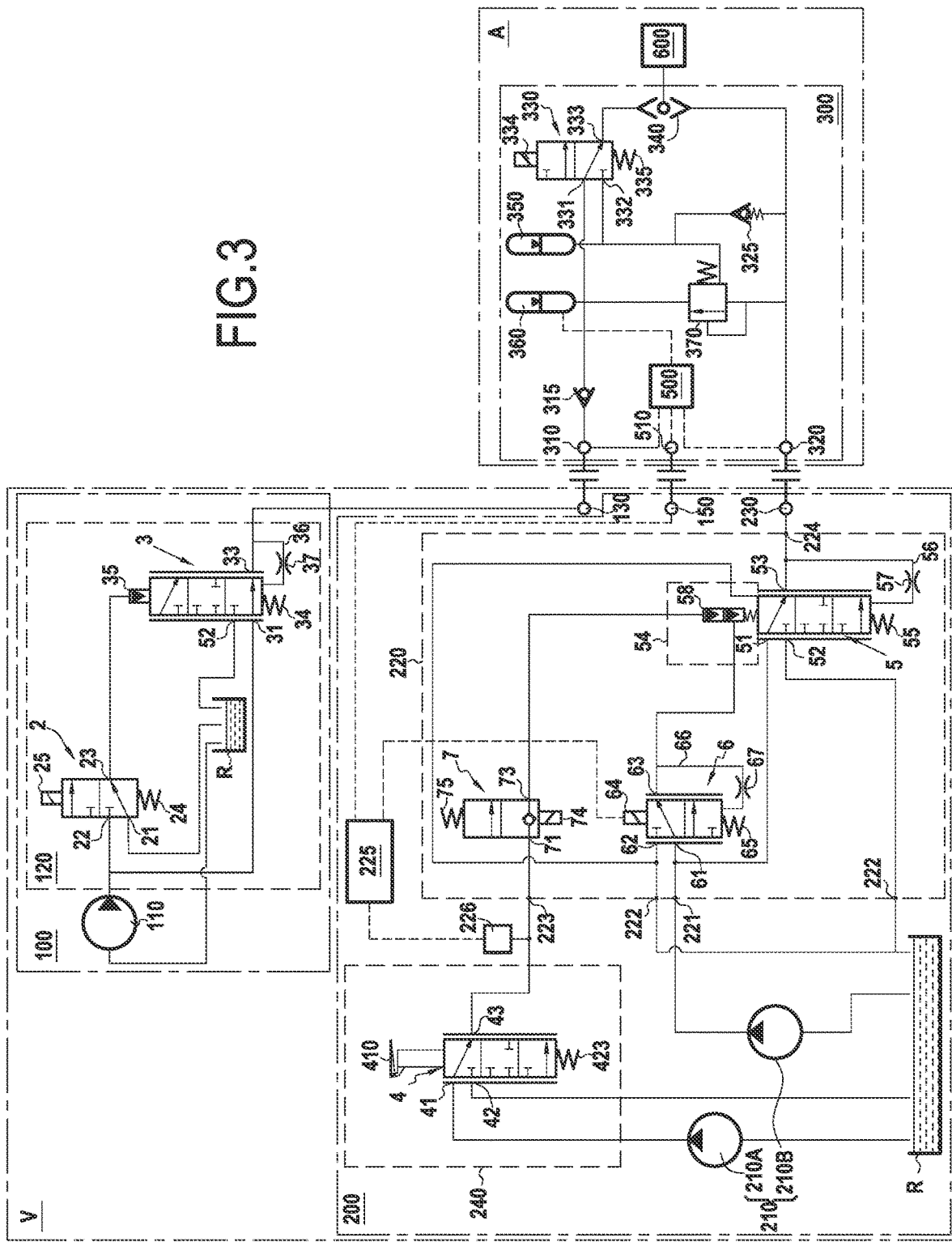
FIG. 3 represents another example of a circuit according to an aspect of the invention.

FIG. 3 shows a variant of the embodiment represented in FIG. 1 described previously.

This embodiment details the structure of the hydraulic supply circuit 100 and of the hydraulic control circuit 200 of the vehicle V. The hydraulic braking circuit 300 of the coupling A remains unchanged with respect to the embodiment already described with reference to FIG. 1.

The hydraulic supply circuit 100 comprises a hydraulic pump 110, as well as a control valve 2 and a supplementary valve 3 forming the supply valve 120 already mentioned with reference to FIG. 1.

The control valve 2 has a first orifice 21 linked to the hydraulic pump 110, a second orifice 22 linked to a reservoir R, and a third orifice 23 linked to a hydraulic actuator 35 of the supplementary valve 3 which will be subsequently described. The control valve 2 is driven by means of an electrical control 25 which is opposed by a return means 24 such as a spring.

The control valve 2 is by default (i.e. If no command is applied via the electrical control 25) in a first configuration wherein the first orifice 21 is closed, and the second orifice 22 is linked to the third orifice 23. The application of a command by the electrical control 25 will cause a switch to a second configuration wherein the first orifice 21 is linked to the third orifice 23, and the second orifice 22 is closed, in such a way that the pressure delivered by the hydraulic pump 110 passes through the control valve 2 and is applied at the third orifice 23. The control valve 2 thus plays the role of an ON/OFF valve.

The supplementary valve 3 is a proportional valve having a first orifice 31 linked to the hydraulic pump 110, a second orifice 32 linked to the reservoir R, and a third orifice 33 linked to the hydraulic supply connector 130. For the sake of clarity in the figures several tanks and pumps have been represented. But obviously there may only be a single reservoir and a single shared pump for the hydraulic supply circuit 100 and for the hydraulic control circuit 200. In a variant if the braking fluids are compatible, there may be only a single pump and a single reservoir for the whole vehicle V.

The supplementary valve 3 is driven by means of a hydraulic actuator 35 opposed by a return means 34 such as a spring and a spur line 36 equipped with a restrictor 37 bleeding the pressure at the outlet of the third orifice 33.

The supplementary valve delivers a pressure to its third orifice 33 proportional to a setpoint applied to the hydraulic actuator 35, or allows the venting of the hydraulic actuator 35 into the reservoir R.

In operation, a setpoint is sent to the electrical control 25, which drives the control valve 2. The latter delivers a pressure driving the supplementary valve 3 via the hydraulic actuator 35, in such a way as to deliver a pressure to the hydraulic supply connector 130. The electrical control 25 is typically configured in such a way as to be engaged when a parking brake of the vehicle V is applied and thus set the supplementary line to zero pressure.

Below is a description of the hydraulic control circuit 200 as shown in FIG. 3.

In this embodiment, the pressure control source 210 composed of two hydraulic pumps 210A and 210B each drawing fluid from the reservoir R. In a variant the two hydraulic pumps 210A and 210B can draw fluid from separate tanks, thus allowing for operation in the event of the vehicle V and its coupling having hydraulic circuits operating with non-compatible fluids.

The hydraulic pump 210A is linked to a control circuit 240, configured in such a way as to deliver a pressure proportional to a control setpoint. In the example represented, the control circuit 200 comprises a proportional setpoint valve 4 comprising:
   a first orifice 41 linked to the hydraulic pump 210A,
   a second orifice 42 linked to the reservoir R, and
   a third orifice 43 forming an outlet orifice of the setpoint valve 4, typically linked to a brake of the vehicle V, and also to a third orifice 223 of the control valve 220 that will be subsequently described.

The setpoint valve 4 is driven by means of a mechanical control 410 which is opposed by a return spring 423, in such a way as to deliver a pressure at its third orifice 43 proportional to a setpoint applied by a user by means of the mechanical control 410.

The control valve 220 already mentioned with reference to FIG. 1 is here composed of three valves that are described below.

The control valve 220 has a first orifice 221 linked to the hydraulic pump 210B, a second orifice 222 linked to the reservoir R, a third orifice 223 linked to the third orifice 43 of the braking valve 4, and a fourth orifice 224 linked to the hydraulic control connector 230. The pressure delivered to the third orifice 223 of the driving circuit 220 is therefore driven via the setpoint valve 4 and is typically proportional or equal to the pressure delivered by the setpoint valve 4. More generally, the third orifice 223 receives a pressure proportional to a braking setpoint, which can be linked or not be linked to a setpoint applied to a main brake of the vehicle V.

The driving circuit 220 typically takes the form of a unit, or of different associated elements linked via hydraulic ducts. It will be understood that some of the orifices mentioned can be duplicated, in particular the second orifice 222 linked to the reservoir R can be duplicated as a function of the structure of the components used, which is the case in the figures. According to the structure chosen for the driving circuit 220, the orifices 221, 222, 223 and 224 can be formed in a unit of the driving circuit, or be formed directly by the orifices of the valves and solenoid valves that are described below.

The driving circuit 220 as represented in FIG. 3 comprises a control valve 5, a proportional solenoid valve 6 and an on/off solenoid valve 7.

The control valve 5 is a proportional valve driven by a hydraulic control.

The control valve 5 has a similar operation to the setpoint valve 4, as described previously, only the driving of this control valve 5 being separate, here a hydraulic control instead of the mechanical control 410 of the setpoint valve 4. The control valve 5 has a first orifice 51 linked to the hydraulic pump 210B via the first orifice 221 of the driving circuit 220, a second orifice 52 linked to the reservoir R via the second orifice 222 of the driving circuit 220, and a third orifice 53 linked to the hydraulic control connector 230 via the fourth orifice 224 of the driving circuit.

The control valve 5 is driven by a hydraulic control 54 which is opposed by a return means 55 such as a spring, and also has a spur line 56 performing a feedback loop function making it possible to reach an equilibrium point when the desired pressure is delivered at the third orifice 53 of the control valve 5 (and therefore to the fourth orifice 224 of the driving circuit 220 and to the hydraulic control connector 230). The spur line 56 is typically equipped with a flow rate limiter 57 or restrictor, and applies a pressure equal to the pressure at the third orifice 53 on the control valve 5, in opposition to the action of the hydraulic control 54. The control valve 5 is typically configured in such a way as to deliver an outlet pressure (i.e. to its third orifice 53, and therefore to the fourth orifice 224 of the driving circuit 220) amplified by an outlet ratio with respect to the driving pressure applied by the hydraulic control 54. By way of example, this outlet ratio is typically between 4 and 9, or else equal to 5, such that the pressure at the level of the third orifice 53 is equal to 5 times the driving pressure applied to the hydraulic control 54.

The control valve 5 is by default (i.e. if no pressure is applied via the hydraulic control 54) in a configuration wherein the first orifice 51 is closed, and the second orifice 52 is linked to the third orifice 53. The application of a pressure by the hydraulic control 54 will switch the control valve 5 to a configuration wherein the first premier orifice 51 is linked to the third orifice 53, and the second orifice 52 is closed, proportionally to the pressure applied by the hydraulic control 54, such that the pressure at the third orifice 53 is proportional to the pressure applied via the hydraulic control 54. It is this configuration that is represented in FIG. 3.

In the embodiment represented, the hydraulic control 54 comprises a hydraulic actuator 58 thus having two pistons respectively linked to a third orifice 63 of the proportional solenoid valve 6, and to a third orifice 73 of the on/off solenoid valve 7 (which will be described below), and drives the pressure of the control valve 5 as the highest pressure between the pressure to the third orifice 63 of the proportional solenoid valve 6 and the pressure to the third orifice 73 of the on/off solenoid valve 7.

The proportional solenoid valve 6 has a first orifice 61 linked to the hydraulic pump 210B via the first orifice 221 of the driving circuit 220, a second orifice 62 linked to the reservoir R via the second orifice 222 of the driving circuit 220, and a third orifice 63 linked to the hydraulic actuator 58 of the hydraulic control 54.

The proportional solenoid valve 6 is driven via an electrical control 64 which is opposed by a return means 65 and a pressure bled at the third orifice 63 by a spur line 66 equipped with a restrictor 67. The proportional solenoid valve 6 is by default (i.e. If no command is applied via the electrical control 64) in a first configuration wherein the first orifice 61 is closed, and the second orifice 62 is linked to the third orifice 63. The application of a control by the electrical control 64 will cause a proportional switching to a second configuration wherein the first orifice 61 is linked to the third orifice 63, and the second orifice 62 is closed, in such a way that the pressure at the third orifice 63 is proportional to the applied command. The electrical control 64 is itself driven by the computer 225, the latter also being coupled to a pressure sensor 226 delivering an item of Information relating to the pressure at the third orifice 223 of the driving circuit 220.

The on/off solenoid valve 7 has a first orifice 71 linked to the third orifice 43 of the setpoint valve 4 and a second orifice 72 linked to the hydraulic actuator 58 of the hydraulic control 54. The on/off solenoid valve 7 thus alternates between a first configuration wherein the first orifice 71 is linked to the second orifice 72 in such a way as to allow the passing of fluid in both directions, and a second configuration wherein the passing of fluid from the first orifice 71 toward the second orifice 72 is impossible (circulation in the reverse direction remaining possible). The hydraulic control 54 is here also linked to the reservoir R in such a way as to permit the venting of fluid.

The on/off solenoid valve 7 is driven by an electrical control 74, which is opposed by a return means 75 such as a spring. The return means 75 by default stays (i.e. If no command is applied by the control 74) in the first configuration. The actuation of the control 74 makes it possible to switch the on/off solenoid valve 7 from the first configuration to the second configuration. This switching is of on/off type, i.e. the application of a command via the control 74 directly switches the on/off solenoid valve 7 to the second configuration, unlike a proportional solenoid valve.

It will be understood from the preceding text that the hydraulic control 54 thus drives the pressure of the control valve 5 as the highest pressure out of the pressure delivered by the proportional solenoid valve 6 and the pressure delivered by the on/off solenoid valve 7.

The driving circuit 220 and the control circuit 240 as proposed make it possible to deliver a pressure to the hydraulic control connector 230 even in the event of an electrical fault. Specifically, in such a situation the hydraulic control 54 drives the pressure of the control valve 5 by the pressure at the third orifice 43 of the setpoint valve 4 via the on/off solenoid valve 7 in its first configuration.

The hydraulic actuator 58 is thus linked to the third orifice 43 of the setpoint valve 4, thus providing a control pressure for the control valve 5 driven in particular by the user via the mechanical control 410.

The embodiment represented in FIG. 3 makes it possible to perform the function of charging the braking accumulator 360 even in the event of an electrical fault of the vehicle V, the driving of the pressure delivered to the hydraulic control connector 230 via the control valve 5 then being provided via the on/off solenoid valve 7.

Although the present Invention has been described with reference to specific exemplary embodiments, it is obvious that modifications and changes can be made to these examples without departing from the general scope of the Invention as defined by the claims. In particular, individual features of the different embodiments Illustrated/mentioned can be combined in additional embodiments. Consequently, the description and the drawings must be considered in an illustrative sense rather than a restrictive sense.

It is also obvious that all the features described with reference to a method are transposable, alone or in combination, to a device, and conversely, all the features described with reference to a device are transposable, alone or in combination, to a method.

The invention claimed is:

1. A hydraulic braking system for a coupling of a vehicle, wherein
   the vehicle comprises a hydraulic supply circuit and a hydraulic control circuit,
   the coupling comprises a hydraulic braking circuit, linked via connectors to the hydraulic supply circuit and to the hydraulic control circuit of the vehicle, and a hydraulic accumulator suitable for delivering a braking pressure to braking means of the coupling,
   the system comprising a driving device configured in such a way that, when
   the vehicle is stopped, and
   the pressure inside the hydraulic accumulator is less than or equal to a threshold pressure value,
   the driving device increases the pressure of the hydraulic accumulator via the hydraulic control circuit,
   wherein the driving device is configured in such a way as to not increase the pressure of the hydraulic accumulator if a test signal is actuated.

2. The braking system as claimed in claim 1, wherein the vehicle comprises a parking brake, and wherein the driving device is configured in such a way as to determine whether or not the vehicle is stopped according to whether or not said parking brake is applied.

3. The braking system as claimed in claim 1, wherein the hydraulic accumulator is linked to the hydraulic control circuit via a calibrated valve, and wherein the driving device is configured in such a way as to deliver a pressure via the hydraulic control circuit strictly greater than calibrating pressure of the calibrated valve.

4. The braking system as claimed in claim 1, further comprising a speed sensor suitable for measuring a speed of travel of the vehicle, and delivering the speed of travel of the vehicle to the driving device.

5. The braking system as claimed in claim 1, wherein the hydraulic supply circuit is configured in such a way as to deliver a zero pressure when a parking brake of the vehicle is applied.

6. The braking system as claimed in claim 2, wherein the hydraulic accumulator is linked to the hydraulic control circuit via a calibrated valve, and wherein the driving device is configured in such a way as to deliver a pressure via the hydraulic control circuit strictly greater than a calibrating pressure of the calibrated valve.

7. The braking system as claimed in claim 1, wherein the hydraulic accumulator is linked to the hydraulic control circuit via a calibrated valve, and wherein the driving device is configured in such a way as to deliver a pressure via the hydraulic control circuit strictly greater than a calibrating pressure of the calibrated valve.

8. The braking system as claimed in claim 2, further comprising a speed sensor suitable for measuring a speed of travel of the vehicle, and delivering the speed of travel of the vehicle to the driving device.

9. The braking system as claimed in claim 3, further comprising a speed sensor suitable for measuring a speed of travel of the vehicle, and delivering the speed of travel of the vehicle to the driving device.

10. The braking system as claimed in claim 2, wherein the hydraulic supply circuit is configured in such a way as to deliver a zero pressure when a parking brake of the vehicle is applied.

11. The braking system as claimed in claim 1, wherein the hydraulic supply circuit is configured in such a way as to deliver a zero pressure when a parking brake of the vehicle is applied.

12. A method for driving a braking system for a vehicle equipped with a coupling,
the vehicle comprising a hydraulic supply circuit and a hydraulic control circuit equipped with a driving device,
the coupling comprising a hydraulic braking circuit linked to the hydraulic supply circuit and to the hydraulic control circuit and comprising a hydraulic accumulator
wherein, when
the vehicle is stopped, and
the pressure inside the hydraulic accumulator is less than or equal to a threshold pressure value,
the driving device increases the pressure of the hydraulic accumulator via the hydraulic control circuit and wherein the driving device only increases the pressure of the hydraulic accumulator via the hydraulic control circuit in the absence of a test signal.

13. The method as claimed in claim 12, wherein the determination of whether or not the vehicle is stopped is performed according to whether or not a parking brake of the vehicle is applied.

14. The method as claimed in claim 12, wherein the driving device drives the hydraulic control circuit in such a way as to deliver a pressure strictly greater than a taring pressure of a calibrated valve linking the hydraulic accumulator to the hydraulic control circuit.

15. The method as claimed in claim 12, wherein a speed sensor delivers an item of information relating to the speed of travel of the vehicle to the driving device.

\* \* \* \* \*